US007010070B2

(12) United States Patent
Li et al.

(10) Patent No.: US 7,010,070 B2
(45) Date of Patent: Mar. 7, 2006

(54) HIGH PERFORMANCE WIRELESS RECEIVER WITH CLUSTER MULTIPATH INTERFERENCE SUPPRESSION CIRCUIT

(75) Inventors: Bin Li, Ronkonkoma, NY (US); Rui Yang, Greenlawn, NY (US); Alexander Reznik, Titusville, NJ (US); Ariela Zeira, Huntington, NY (US)

(73) Assignee: InterDigital Technology Corporation, Wilmington, DE (US)

( * ) Notice: Subject to any disclaimer, the term of this patent is extended or adjusted under 35 U.S.C. 154(b) by 0 days.

(21) Appl. No.: 10/889,939

(22) Filed: Jul. 13, 2004

(65) Prior Publication Data

US 2005/0063500 A1 Mar. 24, 2005

Related U.S. Application Data

(60) Provisional application No. 60/541,670, filed on Feb. 4, 2004, provisional application No. 60/487,148, filed on Jul. 14, 2003.

(51) Int. Cl.
*H04B 1/10* (2006.01)
*H04B 7/216* (2006.01)

(52) U.S. Cl. ...................................... 375/349; 370/342

(58) Field of Classification Search ................ 375/229, 375/236, 316, 346, 348, 349, 350, 235, 267, 375/347; 370/342, 345, 445; 455/63, 296, 455/506, 562.1

See application file for complete search history.

(56) References Cited

U.S. PATENT DOCUMENTS 4,141,072 A * 2/1979 Perreault .................... 702/124
5,432,754 A * 7/1995 Brady et al. ................ 367/134
6,563,868 B1 * 5/2003 Zhang et al. ............... 375/232
6,700,919 B1 * 3/2004 Papasakellariou ........... 375/130
2002/0041637 A1 * 4/2002 Smart et al. ............... 375/316
2003/0026201 A1 * 2/2003 Arnesen ..................... 370/210
2003/0147455 A1 * 8/2003 Simoni et al. ............. 375/148
2003/0152174 A1 * 8/2003 Burke ........................ 375/349
2003/0223516 A1 * 12/2003 Zhang et al. ............... 375/346
2004/0156423 A1 * 8/2004 Li et al. ..................... 375/148
2004/0184473 A1 * 9/2004 Tavli et al. ................. 370/445
2004/0223480 A1 * 11/2004 Nguyen et al. ............ 370/342
2005/0025267 A1 * 2/2005 Reznik et al. .............. 375/346

* cited by examiner

*Primary Examiner*—Emmanuel Bayard
*Assistant Examiner*—Lawrence Williams
(74) *Attorney, Agent, or Firm*—Volpe and Koenig, P.C.

(57) ABSTRACT

A receiver which suppresses inter-cluster multipath interference by processing an impulse channel response consisting of two multipath clusters, each cluster having groups of signals with multiple delays. In one embodiment, the receiver includes a single antenna and parallel-connected delay units used to align the groups of signals before being input into respective sliding window equalizers. The outputs of the equalizers are combined at chip level via a combiner which provides a single output. In another embodiment, a Cluster Multipath Interference Suppression (CMIS) circuit is incorporated into the receiver. The CMIS circuit includes a hard decision unit and a plurality of signal regeneration units to generate replicas of the multipath clusters. The replicas are subtracted from the respective outputs of the delay units and the results are input to the respective sliding window equalizers. In another embodiment, multiple antennas are used to receive and process the clusters.

37 Claims, 4 Drawing Sheets

HIGH PERFORMANCE WIRELESS RECEIVER WITH CLUSTER MULTIPATH INTERFERENCE SUPPRESSION CIRCUIT

CROSS REFERENCE TO RELATED APPLICATION(S)

This application claims priority from U.S. provisional application No. 60/487,148, filed Jul. 14, 2003, and U.S. provisional application No. 60/541,670, filed Feb. 4, 2004, which are incorporated by reference as if fully set forth.

FIELD OF THE INVENTION

The present invention relates to the field of wireless communications. More specifically, the present invention relates to a Code Division Multiple Access (CDMA) receiver for processing a wireless fading channel.

BACKGROUND

For wireless mobile applications using a CDMA air interface, a Rake receiver with a simple receiver structure is commonly used. The Rake receiver despreads each multipath component independently and treats other multipaths as noise. Therefore, the Rake receiver suffers performance loss, in particular when the spreading factor is small. In order to achieve better performance, other receiver designs have to be used.

As shown in FIG. 1A, a typical chip-level equalizer 105 may be used to equalize a receiver channel 110 and generate chip samples 115 with suppressed multipath interference for input into a despreader 120, resulting in improved receiver performance. The despreader 120, in FIG. 1A, uses a single spreading code 125. Alternatively, as shown in FIG. 1B, multiple, such as two despreaders 120A, 120B, using respective spreading codes 125A, 125B, may be used in conjunction with the chip-level despreader 105.

The chip-level equalizer 105 may have different implementations, such as using a minimum mean-square error (MMSE) criteria or a zero forcing (ZF) criteria. Since the MMSE equalizer typically performs better than the ZF equalizer, the MMSE equalizer is more commonly used, although ZF equalizers may be used.

It is desirable to provide a high performance wireless receiver, e.g., a CDMA receiver without the drawbacks of the known prior arrangements.

SUMMARY

The present invention is a receiver which suppresses inter-cluster multipath interference by processing an impulse channel response consisting of at least two multipath clusters, each cluster having groups of signals with multiple delays. In one embodiment, the receiver includes a single antenna and parallel-connected delay units used to align the groups of signals before being input into respective sliding window equalizers. The outputs of the equalizers are combined at chip level via a combiner which provides a single output. In another embodiment, a Cluster Multipath Interference Suppression (CMIS) circuit is incorporated into the receiver. The CMIS circuit includes a hard decision unit and a plurality of signal regeneration units to generate replicas of the multipath clusters. The replicas are subtracted from the respective outputs of the delay units and the results are input to the respective sliding window equalizers. In another embodiment, multiple antennas are used to receive and process the clusters.

The present invention is also a receiver including at least one antenna, a first sliding window equalizer, at least one processing circuit and a combiner. The antenna receives a transmitted wireless signal having a channel impulse response with at least one cluster. The processing circuit processes multipath components of the channel impulse response outside the window associated with the first sliding window equalizer. The combiner combines outputs of the first sliding window equalizer and the at least one processing circuit.

The first sliding window equalizer has a window length based on either a length of the at least one cluster or a predetermined cluster length. The at least one processing circuit may include a second sliding window equalizer having a window length based on either a length of a second cluster of the channel impulse response or a second predetermined cluster length. The at least one processing circuit may include a Rake.

BRIEF DESCRIPTION OF THE DRAWINGS

A more detailed understanding of the invention may be had from the following description, given by way of example and to be understood in conjunction with the accompanying drawings wherein.

DETAILED DESCRIPTION OF THE PREFERRED EMBODIMENT(S)

Figure 1A:
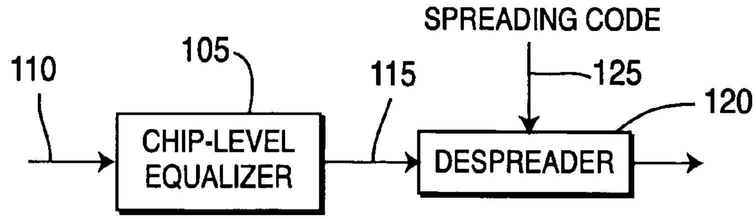
FIG. 1A illustrates a prior art chip equalizer receiver with one code.

The preferred embodiments will be described with reference to the drawing figures where like numerals represent like elements throughout.

Preferably, the present invention disclosed herein is incorporated into a wireless transmit/receive unit (WTRU) and/or a base station. However, it is envisioned that the just about any wireless communication scheme could benefit from the present invention.

Hereinafter, a WTRU includes but is not limited to a user equipment, mobile station, fixed or mobile subscriber unit, pager, or any other type of device capable of operating in a wireless environment. Furthermore, a base station includes, but is not limited to, a Node B, site controller, access point or other interfacing device in a wireless environment.

The features of the present invention may be incorporated into an integrated circuit (IC) or be configured in a circuit comprising a multitude of interconnecting components.

The present invention as described herein, is generally applicable to Time Division Duplex (TDD), Frequency Division Duplex (FDD), and Time Division Synchronous CDMA (TDSCDMA), as applied to a Universal Mobile Telecommunications System (UMTS), CDMA 2000 and CDMA in general, but is envisaged to be applicable to other interference-limited wireless systems.

The samples of the multipath channel response are $\{h_1, h_2, \ldots, h_L\}$. $S=\{s_1, s_2, \ldots, s_K\}$ is the spread data vector of the transmitted signal and $R=\{r_1, r_2, \ldots, r_{K+L-1}\}$ are the samples of the received signals. For this example, the sampling rate is at the chip rate and the relative delays of multipaths are at multiples of the chip interval. The relationship between the transmitted and received signals is as follows:

$$R = \begin{vmatrix} h_1 & & & \\ h_2 & h_1 & & \\ \vdots & h_2 & \ddots & \\ h_L & \vdots & \ddots & h_1 \\ & h_L & \vdots & h_2 \\ & & \ddots & \vdots \\ & & & h_L \end{vmatrix} S^T + N^{def} = HS^T + N \qquad \text{Equation 1}$$

where N is a column vector of the noise samples that are assumed independent Gaussian variables with zero mean and variances$\sigma_n^2$. The notation "T" denotes transposition.

The chip-level equalizer generates data estimates using MMSE or ZF criteria as:

$$\hat{S}^T = \begin{cases} (H^H H + \sigma_n^2 I)^{-1} H^H R & \text{MMSE equalizer} \\ (H^H H)^{-1} H^H R & \text{ZF equalizer} \end{cases} \qquad \text{Equation 2}$$

where the superscript "H" denotes conjugate transpose (Hermetian). I is a unit diagonal matrix.

For Universal Mobile Telecommunications System (UMTS) Frequency Division Duplex (FDD) applications, the signal is transmitted continuously, and a sliding window approach can be used for data processing.

Figure 1B:
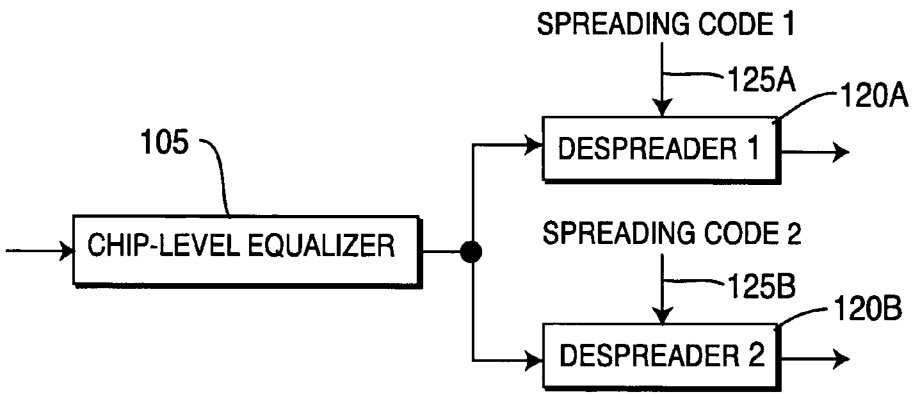
FIG. 1B illustrates a prior art chip equalizer receiver with two codes.
Figure 2:
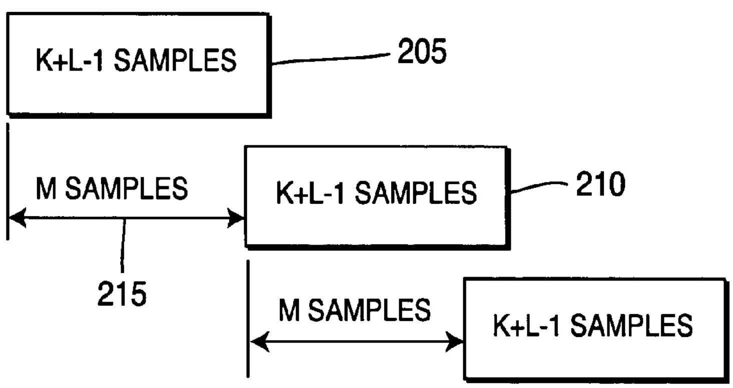
FIG. 2 illustrates prior art sliding window blocks for equalizer input data.

Referring to FIG. 2, a first block window 205 uses received input samples $R_1=\{r_1, r_2, \ldots, r_{K+L-1}\}$ with a length of K+L−1. The chip-equalizer 105 shown in FIGS. 1A and 1B generates K samples using equation 2. Among these K samples, only the M middle part samples 215 are used as the chip-equalizer 105 output in order to remove the "edge effect" of a sliding window of the chip-equalizer 105. A second block window 210 uses input samples $R_2=\{r_{M+1}, r_{M+2}, \ldots, r_{K+M+L-1}\}$ and generates an output of K samples.

The main matrix operations for a chip-level MMSE equalizer are the matrix multiplication $H^H H$ and matrix inversion$(H^H H+\sigma_n^2 I)^{-1}$, which represents the complexity of the chip-level equalizer 105 and depends on the size of H. From the performance point of view, the window size is to be selected as large as possible, i.e., K is much larger than L. But from the implementation complexity point of view, the window size is to be selected as small as possible. Therefore, in order to balance the performance and complexity, K is usually 5 to 10 times larger than L.

For most of the channel cases, the delay spread L is less than 20 chips (assuming that the chip rate is 3.84 Mc/s). If K is selected to be 8 times the size of L, then K=8*20=160 chips. But for some channel cases like the test case 2 in working group 4 specified in the UMTS standards, the delay spread can be up to 80 chips, and the window size is K=8*80=640 chips. Since the window size is increased 4 times, the complexity will increase more than 16 times. This large increase in complexity leads to an infeasible implementation of a chip-level equalizer for this large delay spread.

Figure 3:
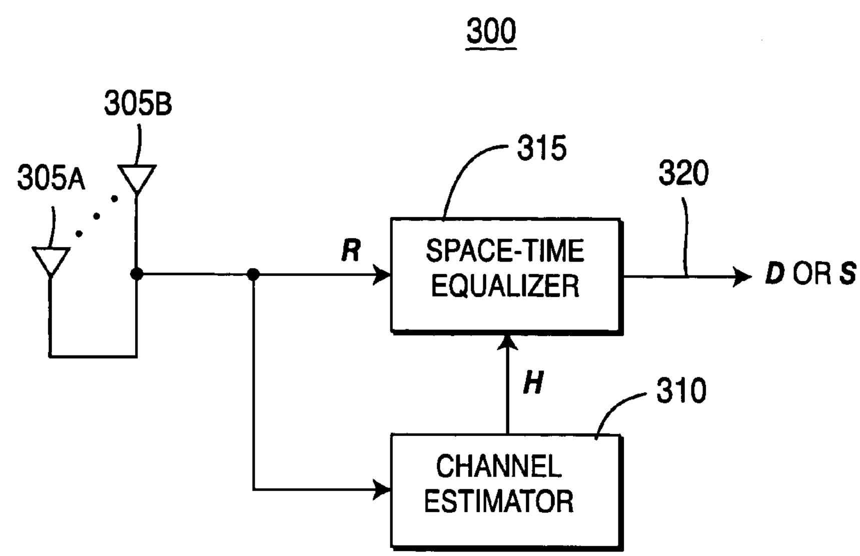
FIG. 3 is a block diagram of a channel estimation receiver system in accordance with one embodiment of the present invention.

FIG. 3 is a simplified block diagram of a receiver 300 using space-time (ST) equalization in accordance with the present invention. The receiver 300 may use one or a plurality of antennas 305A, 305B, a channel estimator 310, and an ST equalizer 315. A received vector R or multiple received vectors (corresponding to each antenna 305A and 305B) is input into the ST equalizer 315. A channel estimator 310 estimates the channel response H of the received signals. The ST equalizer 315 produces either a spread data vector S or a data vector D, based on the implementation. If the spread data vector S is produced, a dispreading step is used to produce the data vector D.

Figure 4:
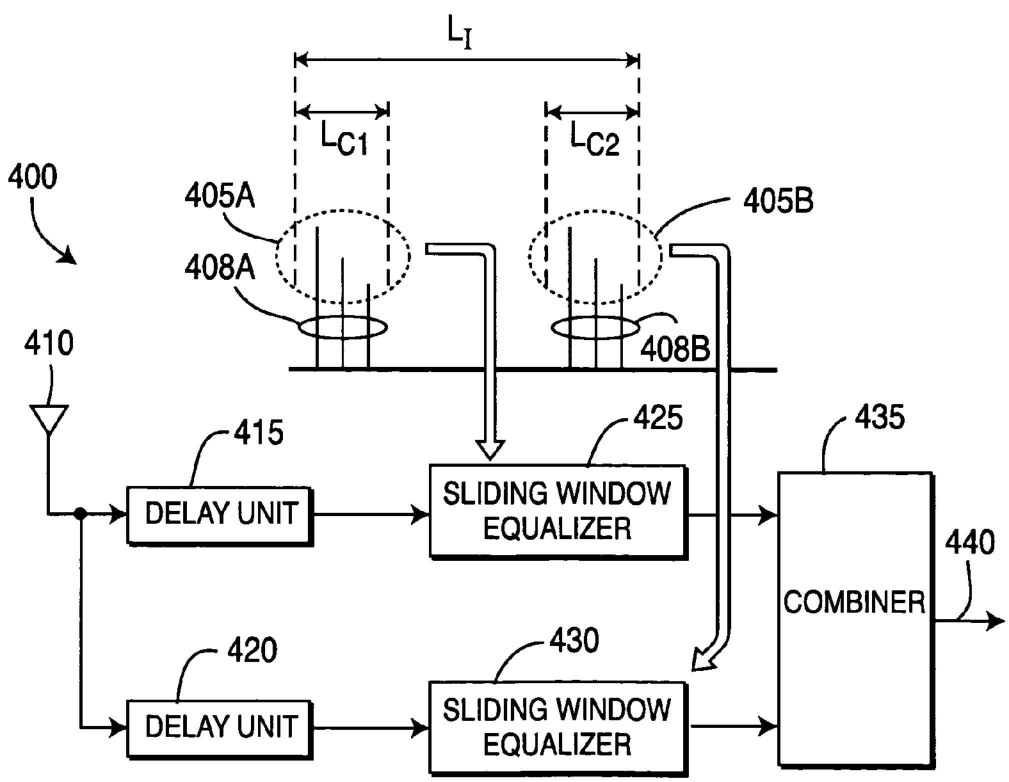
FIG. 4 is a block diagram of a dual equalizer receiver in accordance with one embodiment of the present invention.

FIG. 4 is a block diagram of a receiver 400 which suppresses cluster multipath interference according to one embodiment of the present invention. The receiver 400 may reside within a WTRU and/or a base station. The receiver 400 processes an impulse channel response consisting of two multipath clusters 405A, 405B, each having groups of signals 408A, 408B with multiple delays. Although, for simplicity, the impulse channel response is shown as having only two clusters, the pulse response may have more clusters. Also, the impulse response may have multipath components (typically of lesser magnitude) outside of the clusters. The receiver 400 includes a single antenna 410 connected to two parallel delay units 415, 420 used to align the groups of signals 408A, 408B. The output of each of the delay units 415, 420, is connected to an input of a respective sliding window equalizer 425, 430. The equalizers 425, 430, preferably use MMSE equalizers, although other equalizers may be used. The outputs of the sliding window equalizers 425, 430, are combined via a combiner 435 which provides a single output 440, such as a spread data vector S or data vector D.

Within each cluster 405A, 405B, the spread between the multipath delays is relatively small. However, the delay in time domain between the two clusters 405A, 405B, is, in comparison, very large. Each of the two sliding window equalizers 425, 430, reduce interference associated with a respective cluster 405A, 405B, while minimizing the size requirements of the sliding window used by the equalizers 425, 430. Thus, the complexity of the equalizer components is reduced because the size of the window is reduced. The number of clusters processed may be increased by adding more delay units and sliding window equalizers. In some embodiments, some equalizers, such as equalizer 430, may be replaced with a Rake receiver.

The output 440 of the combiner 435 may be defined by $\hat{S}^T=\hat{S}_1^T+\hat{S}_2^T$ where $$\hat{S}_i^T = \begin{cases} (H_i^H H_i + \sigma_n^2 I)^{-1} H_i^H R & \text{MMSE equalizer} \\ (H_i^H H_i)^{-1} H_i^H R & \text{ZF equalizer,} \end{cases}$$

$\hat{S}_i^T$ (i=1,2) is the output of equalizer 425 or 430, and $H_i$ (i=1,2) is the channel response of cluster 405A or 405B.

To illustrate using FIG. 4, the impulse response has a length of $L_T$. A first cluster 405A has a length of $L_{C1}$ and the second cluster 405B has a length of $L_{C2}$. Instead of utilizing a sliding window equalizer configured to process a window of at least $L_I$ in size, the sliding window equalizers can be configured to process a window of at least $L_{C1}$ or $L_{C2}$ in size. As illustrated in FIG. 4, each cluster 405A, 405B has a length $L_{C1}$, $L_{C2}$, substantially shorter than $L_I$. In many impulse response profiles, the cluster length $L_{C1}$, $L_{C2}$ is far less than the delay between the clusters, although some profiles may have a smaller delay between clusters. Due to the decreased window size, considerable complexity reduction can be achieved in the sliding window equalizers.

To support diversity between two cells, one equalizer 425, 430, may be assigned to each respective cell. If support of more cells is desired, or if simultaneous support of more cells and large delay spread signals is desired, more equalizer elements may be added, with, typically, at least one equalizer element per cell. However, the general combining principle would be the same as for the two-equalizer element case described above. The timing of the signal clusters transmitted by a base station may actually coincide in the code-phase (delay plane). However, since the clusters are typically implemented using different signature codes (such as scrambling codes), different equalizer elements may be applied.

The application of this receiver structure to multi-cell macro-diversity combining requires certain synchronization of the transmission of the (same) data from difference sources (cells). This is a recognized requirement and is addressed in any cellular communication system that supports macro-diversity in the downlink. For example, UMTS FDD synchronizes transmission of data from different cells to within 292 chips. The residual delay can then be removed by an additional synchronization circuit at the receiver, which is essentially an extended delay buffer that is already present.

Figure 5:
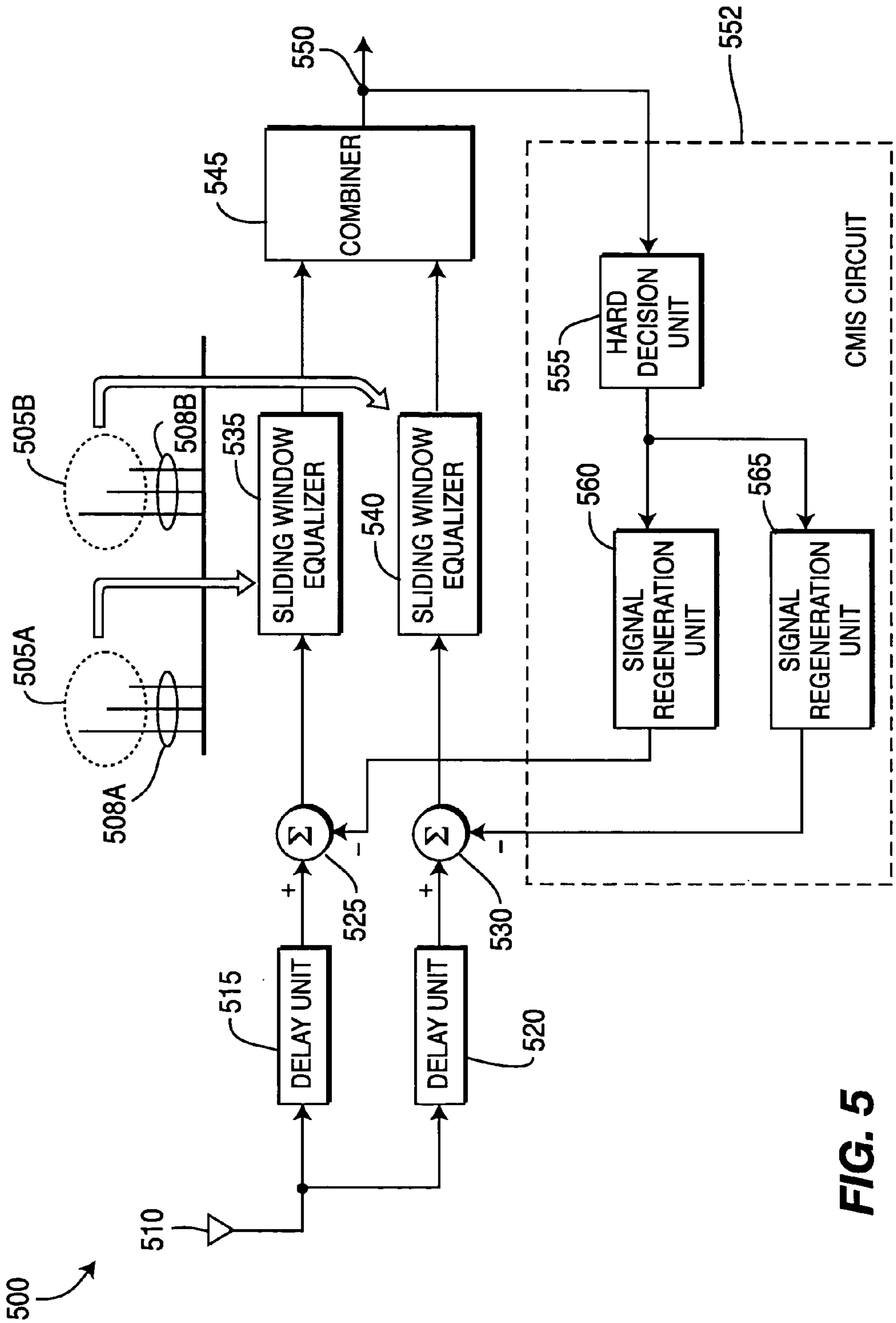
FIG. 5 is a block diagram of a dual equalizer receiver including a cluster multipath interference cancellation circuit in accordance with another embodiment of the present invention.

FIG. 5 is a block diagram of a receiver 500 which suppresses cluster multipath interference according to another embodiment of the present invention. The receiver 500 may reside within a WTRU and/or a base station. The receiver 500 processes an impulse channel response consisting of two multipath clusters 505A, 505B, each having groups of signals 508A, 508B with multiple delays. The receiver 500 includes a single antenna 510 connected to two parallel delay units 515, 520 used to align the groups of signals 508A, 508B. The output of each of the delay units 515, 520, is connected to respective first inputs of summers 525, 530, which, in turn, connect to the inputs of respective sliding window equalizers 535, 540. The equalizers 535, 540, may be chip-level MMSE equalizers. The outputs of the sliding window equalizers 535, 540, are combined via a combiner 545 which provides a single output 550. A CMIS circuit 552 is connected between the output 550 of the combiner 545 and respective second inputs of the summers 525, 530. The CMIS circuit includes a hard decision unit 555 having an input connected to the output 550 of the combiner 545, and two signal regeneration units 560, 565, which are connected between an output of the hard decision unit 555 and the respective second inputs of the summers 525, 530. The signal regeneration units 560, 565, produce the contribution of each cluster to the receiver vector. The summer 525 subtracts the output of the signal regeneration unit 560 from the output of the delay unit 515 and outputs a first result to the input of the sliding window equalizer 535. The summer 530 subtracts the output of the signal regeneration unit 565 from the output of the delay unit 520 and outputs a second result to the input of the sliding window equalizer 540. Effectively, the summers 525, 530, remove the contribution of one or multiple clusters from the received vector, prior to processing by the sliding window equalizers 535, 540.

The output 550 of the combiner 545 may be defined by $\hat{S}^T = \hat{S}_1^T + \hat{S}_2^T$ where $$\hat{S}_i^T = \begin{cases} (H_i^H H_i + \sigma_n^2 I)^{-1} H_i^H R_i & \text{MMSE equalizer} \\ (H_i^H H_i)^{-1} H_i^H R_i & \text{ZF equalizer,} \end{cases}$$

$\hat{S}_i^T$ (i=1,2) is the output of equalizer 535 or 540, $H_i$ (i=1,2) is the channel response of cluster 505A or 505B, and $R_i$ (i=1,2) is a received signal with interference (from the other cluster) removed or subtracted.

As with FIG. 4, within each cluster 505A, 505B, the spread between the multipath delays is relatively small. However, the delay in time domain between the two clusters 505A, 505B, is very large. In an alternate embodiment, one of the equalizers, such as the equalizer 540 may be replaced with a Rake.

The output 550 of the combiner 545 is used by the hard decision unit 555 to detect the transmitted signal by making a hard-decision. The signal regeneration unit 560 generates a replica of cluster 505B and the signal regeneration unit 565 generates a replica of cluster 505A. After generating the replicas of the two clusters 505B, 505A, they are subtracted from the aligned signals output from respective delay units 515, 520, via the summers 525, 530, respectively. If more than two clusters are processed, the contribution of multiple clusters is removed by each summer.

Figure 6:
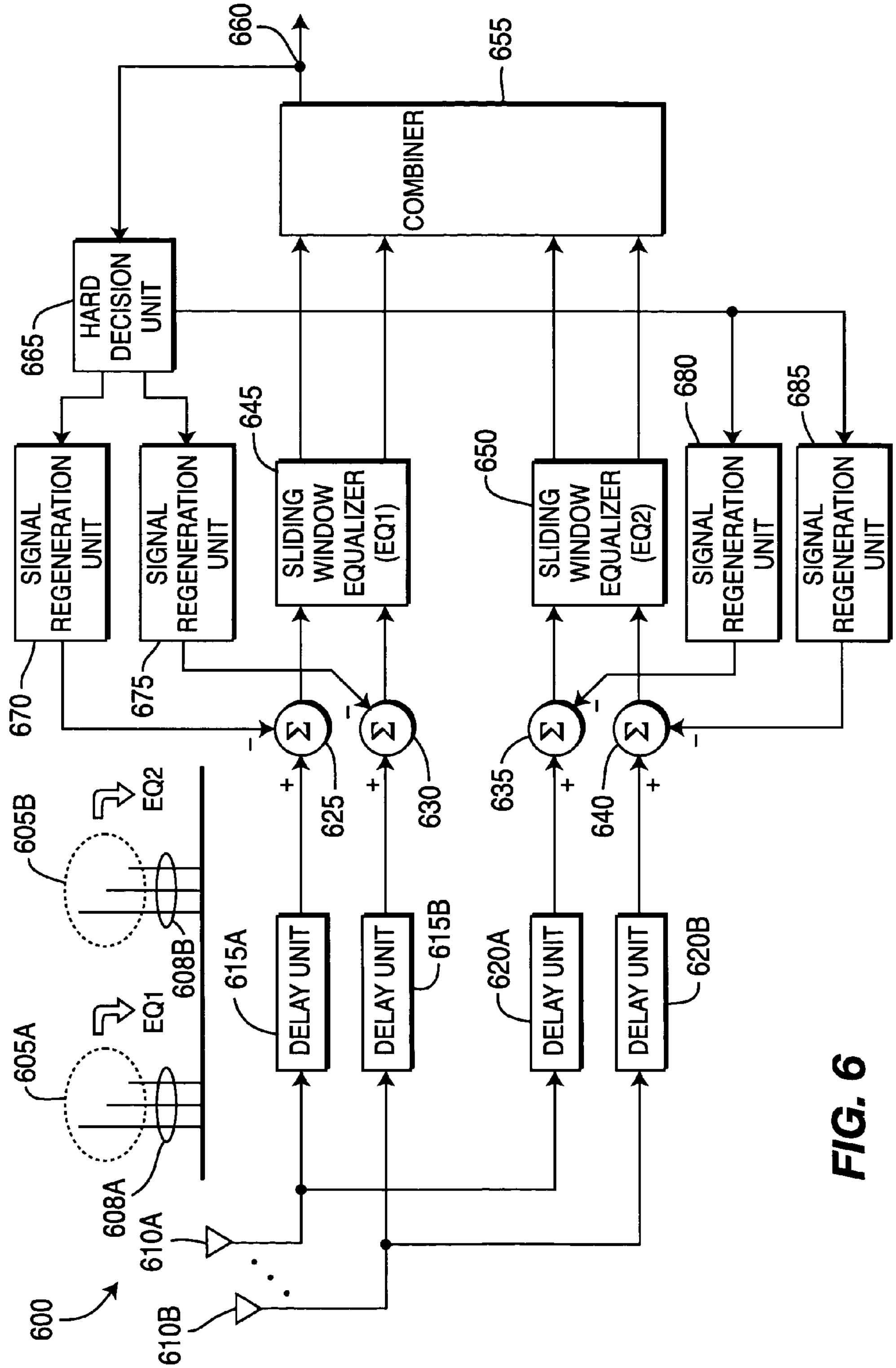
FIG. 6 is a block diagram of a multi-antenna receiver including a cluster multipath interference cancellation circuit in accordance with another embodiment of the present invention.

FIG. 6 is a block diagram of a multi-antenna receiver including a CMIC circuit in accordance with another embodiment of the present invention. The receiver 600 may reside within a WTRU and/or a base station. The receiver 600 processes an impulse channel response consisting of two multipath clusters 605A, 605B, each having groups of signals 608A, 608B with multiple delays. The receiver 600 includes at least two antennas 610A, 610B. Antenna 610A is connected to two parallel delay units 615A, 620A, used to align the groups of signals 608A, 608B, received via the antenna 610A. Antenna 610B is connected to two parallel delay units 615B, 620B, used to align the groups of signals 608A, 608B, received via the antenna 610B. The output of each of the delay units 615A, 615B, are connected to respective first inputs of summers 625, 630, which, in turn, connect to the inputs of a sliding window equalizer 645. The output of each of the delay units 620A, 620B, are connected to respective first inputs of summers 635, 640, which, in turn, connect to the inputs of a sliding window equalizer 650. The outputs of the sliding window equalizers 645, 650, are combined via a combiner 655 which provides a single output 660. A CMIS circuit is connected between the output 660 of the combiner 655 and respective second inputs of the summers 625, 630, 635, 640. The CMIS circuit includes a hard decision unit 665 having an input connected to the output 660 of the combiner 655, and four signal regeneration units 670, 675, 680, 685, which are connected between an output of the hard decision unit 665 and the respective second inputs of the summers 625, 630, 635, 640.

The summer 625 subtracts the output of the signal regeneration unit 670 from the output of the delay unit 615A and outputs a first result to the input of the sliding window equalizer 645. The summer 630 subtracts the output of the signal regeneration unit 675 from the output of the delay unit 615B and outputs a second result to the input of the sliding window equalizer 645.

The summer 635 subtracts the output of the signal regeneration unit 680 from the output of the delay unit 620A and outputs a third result to the input of the sliding window equalizer 650. The summer 640 subtracts the output of the signal regeneration unit 685 from the output of the delay unit 620B and outputs a fourth result to the input of the sliding window equalizer 650. In an alternate embodiment, one or more of the sliding window equalizers may be replaced by a Rake.

The output 660 of the combiner 655 is used by the hard decision unit 665 to detect the transmitted signal by making a hard-decision. The signal regeneration units 670, 675, generate a replica of the cluster 605B and the signal regeneration units 680, 685, generate a replica of the cluster 605A. After generating the replicas of the two clusters 605B, 605A, they are subtracted from the aligned signals output from respective delay units 615A, 615B, 620A, 620B, via the summers 625, 630, 635, 640, respectively.

In a UMTS CDMA system, the present invention is applied to a large delay-spread channel and a single base station. However, the present invention also applies to multiple base stations. In the test case 2 of the UMTS wideband CDMA standard, the channel transmission profile has 3 paths with equal gain power and with the delay of 0, 960 ns and 20,000 ns. The first two paths are treated as the first cluster and a MMSE equalizer receiver is used to detect the signal. The last path is treated as a single path in the second cluster and a Rake receiver is used to detect that path.

While the present invention has been described in terms of the preferred embodiment, other variations which are within the scope of the invention as outlined in the claims below will be apparent to those skilled in the art.

What is claimed is:

1. A receiver comprising:

at least one antenna for receiving a transmitted wireless signal having a channel impulse response with at least one cluster;

a first sliding window equalizer having a window length based on either a length of the at least one cluster or a predetermined cluster length;

at least one circuit for processing multipath components of the channel impulse response outside the window associated with the first sliding window equalizer; and a combiner for combining outputs of the first sliding window equalizer and the at least one circuit.

2. The receiver of claim 1 wherein the at least one circuit comprises a second sliding window equalizer having a window length based on either a length of a second cluster of the channel impulse response or a second predetermined cluster length.

3. The receiver of claim 1 wherein the at least one circuit comprises a Rake.

4. The receiver of claim 1 wherein the window length of the first sliding window equalizer is a multiple of the length of the at least one cluster or the predetermined cluster length.

5. The receiver of claim 1 wherein the predetermined cluster length is a maximum expected cluster length.

6. The receiver of claim 1 wherein the predetermined cluster length is a multiple of a typical expected cluster length.

7. A receiver for receiving and processing an impulse channel response including at least two multipath clusters, the receiver comprising:

(a) a first delay unit which delays multipaths residing in a first one of the clusters;

(b) a second delay unit which delays multipaths residing in a second one of the clusters;

(c) a first sliding window equalizer which receives the delayed multipaths from the first delay unit and outputs a first equalized signal associated with the first cluster;

(d) a second sliding window equalizer which receives the delayed multipaths from the second delay unit and outputs a second equalized signal associated with the second cluster; and (e) a combiner which receives the first and second equalized signals and outputs a combined signal.

8. The receiver of claim 7 wherein the receiver is configured to support multi-cell macro-diversity by assigning the first sliding window equalizer to a first cell and assigning the second sliding window equalizer a second cell, such that data transmitted from the first and second cells is synchronized and any resulting residual delay is removed.

9. The receiver of claim 7 wherein the second sliding window equalizer is a Rake receiver.

10. The receiver of claim 7 wherein the first sliding window equalizer is a chip-level minimum mean-square error (MMSE) equalizer.

11. The receiver of claim 7 further comprising:

(f) an interference suppression circuit which generates replicas of the clusters based on the combined signal;

(g) a first summer in communication with the suppression circuit, the first summer being configured to subtract a replica of the second cluster from the output of the first delay unit and outputting a first interference-free resulting signal to the first sliding window equalizer; and (h) a second summer in communication with the suppression circuit, the second summer being configured to subtract a replica of the first cluster from the output of the second delay unit and output a second interference-free resulting signal to the second sliding window equalizer.

12. The receiver of claim 7 further comprising:

(f) an antenna connected to an input of the first and second delay units.

13. The receiver of claim 7 further comprising:

(f) a first antenna connected to an input of the first delay unit; and (g) a second antenna connected to an input of the second delay unit.

14. A wireless transmit/receive unit (WTRU) comprising:

at least one antenna for receiving a transmitted wireless signal having a channel impulse response with at least one cluster;

a first sliding window equalizer having a window length based on either a length of the at least one cluster or a predetermined cluster length;

at least one circuit for processing multipath components of the channel impulse response outside the window associated with the first sliding window equalizer; and a combiner for combining outputs of the first sliding window equalizer and the at least one circuit.

15. The WTRU of claim 14 wherein the at least one circuit comprises a second sliding window equalizer having a window length based on either a length of a second cluster of the channel impulse response or a second predetermined cluster length.

16. The WTRU of claim 14 wherein the at least one circuit comprises a Rake.

17. The WTRU of claim 14 wherein the window length of the first sliding window equalizer is a multiple of the length of the at least one cluster or the predetermined cluster length.

18. The WTRU of claim 14 wherein the predetermined cluster length is a maximum expected cluster length.

19. The WTRU of claim 14 wherein the predetermined cluster length is a multiple of a typical expected cluster length.

20. A wireless transmit/receive unit (WTRU) for receiving and processing an impulse channel response including at least two multipath clusters, the WTRU comprising:

(a) a first delay unit which delays multipaths residing in a first one of the clusters;

(b) a second delay unit which delays multipaths residing in a second one of the clusters;

(c) a first sliding window equalizer which receives the delayed multipaths from the first delay unit and outputs a first equalized signal associated with the first cluster;

(d) a second sliding window equalizer which receives the delayed multipaths from the second delay unit and outputs a second equalized signal associated with the second cluster; and (e) a combiner which receives the first and second equalized signals and outputs a combined signal.

21. The WTRU of claim 20 wherein the WTRU is configured to support multi-cell macro-diversity by assigning the first sliding window equalizer to a first cell and assigning the second sliding window equalizer a second cell, such that data transmitted from the first and second cells is synchronized and any resulting residual delay is removed.

22. The WTRU of claim 20 wherein the second sliding window equalizer is a Rake receiver.

23. The WTRU of claim 20 wherein the first sliding window equalizer is a chip-level minimum mean-square error (MMSE) equalizer.

24. The WTRU of claim 20 further comprising:

(f) an interference suppression circuit which generates replicas of the clusters based on the combined signal;

(g) a first summer in communication with the suppression circuit, the first summer being configured to subtract a replica of the second cluster from the output of the first delay unit and outputting a first interference-free resulting signal to the first sliding window equalizer; and (h) a second summer in communication with the suppression circuit, the second summer being configured to subtract a replica of the first cluster from the output of second delay unit and output a second interference-free resulting signal to the second sliding window equalizer.

25. The WTRU of claim 20 further comprising:

(f) an antenna connected to an input of the first and second delay units.

26. The WTRU of claim 20 further comprising:

(f) a first antenna connected to an input of the first delay unit; and (g) a second antenna connected to an input of the second delay unit.

27. An integrated circuit (IC) for receiving a transmitted wireless signal having a channel impulse response with at least one cluster, the IC comprising:

a first sliding window equalizer having a window length based on either a length of the at least one cluster or a predetermined cluster length;

at least one circuit for processing multipath components of the channel impulse response outside the window associated with the first sliding window equalizer; and a combiner for combining outputs of the first sliding window equalizer and the at least one circuit.

28. The IC of claim 27 wherein the at least one circuit comprises a second sliding window equalizer having a window length based on either a length of a second cluster of the channel impulse response or a second predetermined cluster length.

29. The IC of claim 27 wherein the at least one circuit comprises a Rake.

30. The IC of claim 27 wherein the window length of the first sliding window equalizer is a multiple of the length of the at least one cluster or the predetermined cluster length.

31. The IC of claim 27 wherein the predetermined cluster length is a maximum expected cluster length.

32. The IC of claim 27 wherein the predetermined cluster length is a multiple of a typical expected cluster length.

33. An integrated circuit (IC) for receiving and processing an impulse channel response including at least two multipath clusters, the IC comprising:

(a) a first delay unit which delays multipaths residing in a first one of the clusters;

(b) a second delay unit which delays multipaths residing in a second one of the clusters;

(c) a first sliding window equalizer which receives the delayed multipaths from the first delay unit and outputs a first equalized signal associated with the first cluster;

(d) a second sliding window equalizer which receives the delayed multipaths from the second delay unit and outputs a second equalized signal associated with the second cluster; and (e) a combiner which receives the first and second equalized signals and outputs a combined signal.

34. The IC of claim 33 wherein the IC is configured to support multi-cell macro-diversity by assigning the first sliding window equalizer to a first cell and assigning the second sliding window equalizer a second cell, such that data transmitted from the first and second cells is synchronized and any resulting residual delay is removed.

35. The IC of claim 33 wherein the second sliding window equalizer is a Rake receiver.

36. The IC of claim 33 wherein the first sliding window equalizer is a chip-level minimum mean-square error (MMSE) equalizer.

37. The IC of claim 33 further comprising:

(f) an interference suppression circuit which generates replicas of the clusters based on the combined signal;

(g) a first summer in communication with the suppression circuit, the first summer being configured to subtract a replica of the second cluster from the output of the first delay unit and outputting a first interference-free resulting signal to the first sliding window equalizer; and (h) a second summer in communication with the suppression circuit, the second summer being configured to subtract a replica of the first cluster from the output of the second delay unit and output a second interference-free resulting signal to the second sliding window equalizer.

* * * * *

UNITED STATES PATENT AND TRADEMARK OFFICE

CERTIFICATE OF CORRECTION

PATENT NO. : 7,010,070 B2
APPLICATION NO. : 10/889939
DATED : March 7, 2006
INVENTOR(S) : Li et al.

It is certified that error appears in the above-identified patent and that said Letters Patent is hereby corrected as shown below:

IN THE SPECIFICATION

At column 1, line 37, after the word “chip-level”, delete “despreader” and insert therefor --equalizer--.

At column 3, lines 19, 20, & 22, column 3 of Equation 1, delete “$\iddots$ ” and insert therefor-- $\ddots$ --.

At column 3, line 28, after the word “and”, delete “variances$\sigma_n^2$.” and insert therefor --variance $\sigma_n^2$--.

At column 7, line 29, after the word “and”, delete “a” and insert therefor --an--.

Signed and Sealed this

Twenty-first Day of November, 2006

JON W. DUDAS

*Director of the United States Patent and Trademark Office*